United States Patent Office 3,119,944
Patented Jan. 28, 1964

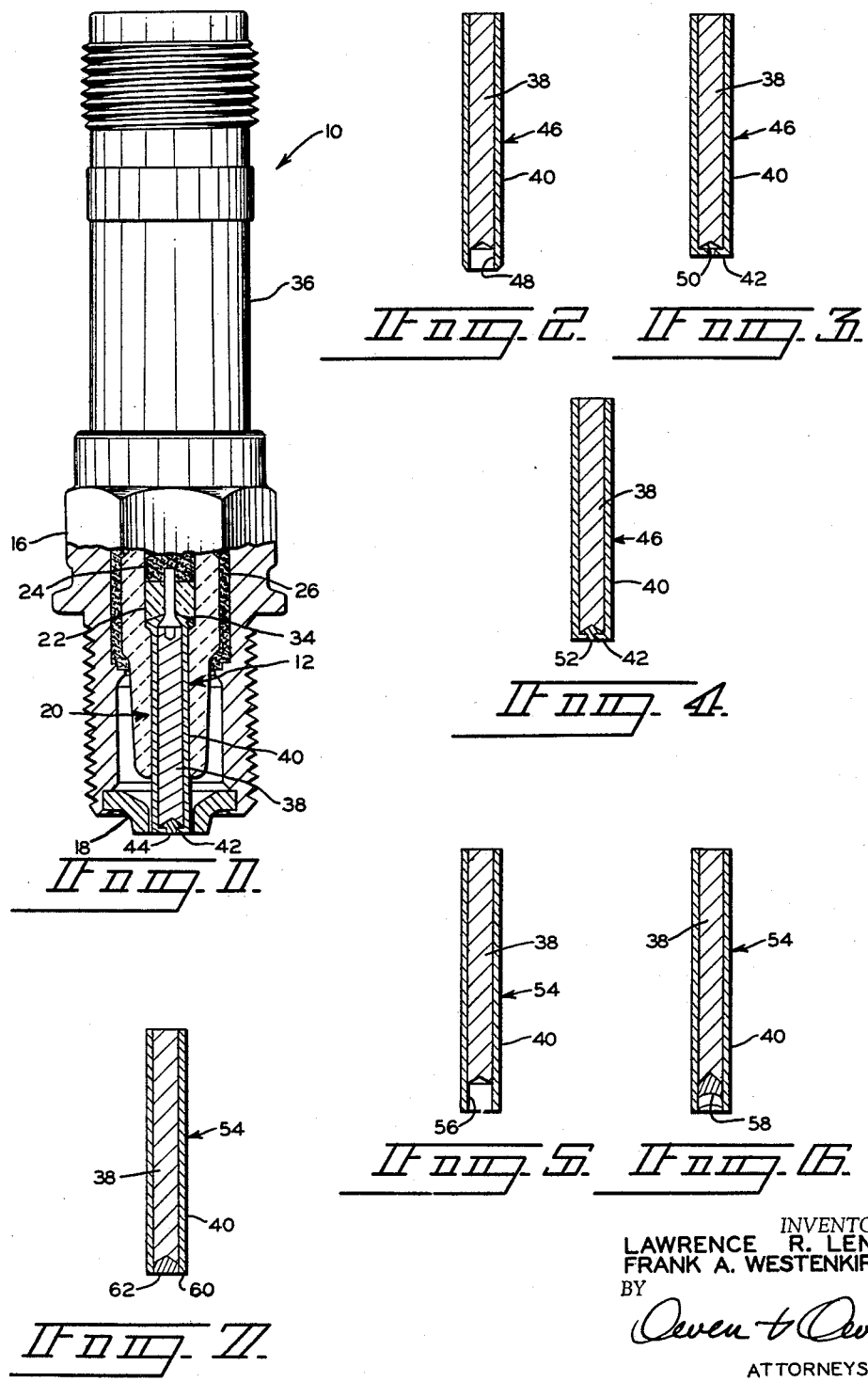

3,119,944
SPARK PLUG ELECTRODE
Lawrence R. Lentz and Frank A. Westenkirchner, Toledo, Ohio, assignors to Champion Spark Plug Company, Toledo, Ohio, a corporation of Delaware
Filed July 25, 1961, Ser. No. 126,641
7 Claims. (Cl. 313—141)

This invention relates to an improved spark plug and more particularly to a spark plug electrode having an improved firing end.

Nickel alloy electrodes having a copper core have long been known in the art. The copper core is particularly advantageous for use in the electrodes because it provides high heat conductivity to maintain the firing end of the electrode cooler and thereby minimize the possibility of pre-ignition. The body of copper, however, is subject both to erosion and corrosion and, while it is encased in a sheath of a nickel alloy or other suitable material to provide protection for the copper against contact with products of combustion, the copper exposed at the firing end of the electrode is still subjected to these gases and gradually wears away. This erosion leaves the protective sheath at the end in the form of a hollow tube now exposed to the hot gases on the inside as well as the outside. When this occurs, overheating of the firing end may result in preignition and rapid failure of the spark plug.

In an attempt to overcome this problem, it has been proposed heretofore to place a platinum pin or rivet in the firing end of the electrode with the nickel alloy sheath crimped inwardly therearound to provide a mechanical connection therebetween. While this may prevent corrosion and erosion of the copper core if a perfect bond is obtained, the mechanical bond between the electrode and the pin often becomes loose upon repeated heating and cooling and the pin then becomes loosened.

The electrode according to the present invention overcomes the above problems. The new electrode is made by employing a composite rod with a copper core and a protective sheath, preferably of a nickel or a chrome-nickel steel, and removing the copper at one end to leave a recess therein, which is then filled with a brazing material, preferably one of nickel and phosphorous. The combination is then heated to the proper brazing temperature and cooled after the brazing material is fully melted. A smooth end is formed on the firing end, either by forming over part of the sheath before the brazing material is fired or by cutting off the tip of the end after the material is fired and cooled.

The new electrode has the advantage that the copper is protected by means of a brazing material which is considerably more resistant to erosion and corrosion than is the copper. The protective brazing material has a high rate of heat conductivity approaching that of copper so that the conductivity of the over all electrode is not significantly less than that of an electrode employing a conventional copper core. Further, the bond effected between the brazed material and the copper is much more complete than has been heretofore possible so that heat conductivity is not seriously decreased because of the connection therebetween.

It is, therefore, a principal object of the invention to provide an improved electrode for a spark plug, which electrode has high heat conductivity and high resistance to erosion and corrosion.

Another object of the invention is to provide an improved protective firing tip for the firing end of a spark plug electrode, which tip is bonded more effectively to the main part of the electrode.

Other objects and advantages of the invention will be apparent from the following detailed description of preferred embodiments thereof, reference being made to the accompanying drawings, in which:

FIG. 1 is a view in partial vertical cross section of a spark plug employing a center electrode according to the invention;

FIGS. 2–4 are enlarged views in vertical cross section of an electrode according to the invention, in various stages of manufacture; and FIGS. 5–7 are enlarged views in vertical cross section of a modified electrode according to the invention, in various stages of manufacture.

Referring to the drawings, and particularly to FIG. 1, an over all spark plug 10 embodying the invention is a type commonly used in aircraft. The spark plug 10 basically includes a center sparking assembly 12, an insulating body 14, a metal shell 16, and a ground electrode 18. The center sparking unit 12 includes a center electrode 20, embodying the principles of the invention, sealed in the shell in any suitable manner as by conventional seals 22 and 24. Current is led to the center electrode in a conventional manner which forms no part of the present invention. The insulator and center electrode assembly are held in gas tight sealed relationship to the shell by, for example, a sealing and holding body 26.

The center electrode 20 includes a copper core 38 for high heat conductivity and an outer protective sheath 40 which can be made of stainless steel or the like, number 836 alloy being preferred, to protect the core from erosion and corrosion. The lower end of the sheath 40 is turned inwardly to form an annular flange 42 with brazing material 44 located at the firing end and exposed through the center of this end.

Referring more particularly to FIGS. 2–4, the center electrode 20 is made by the following technique: A rod 46 with the copper core 38 and the sheath 40 is drilled at one end to remove part of the copper core 38 therefrom and to leave a recess 48. The end of the sheath is then turned in to form the inwardly extending flange 42, the flange 42 being formed to leave a small recess 50 therebehind. The electrode is then inverted and brazing material 52 is placed in the small recess 50; the rod 46 and the material 52 are then heated to brazing temperature in order to melt the material 52 and enable it to contact fully the copper core 38, the sheath 40, and the flange 42. When cooled, the end can be ground to assure that the flange 42 and the brazed tip 44 are flush. The brazing material forms the protective tip 44 and completes the manufacture of the electrode 20 except for the pin 26 at the upper end which can be assembled with the electrode in a known manner. The corrosion resistance of the brazing material 52 preferably is similar to that of the sheath 40.

A modified center electrode can be made as shown in FIGS. 5–7. In this instance, a rod 54 with the copper core 38 and the sheath 40 is drilled out to provide a recess 56 in the same manner as shown in FIG. 2 but with the recess 56 being deeper than the recess 48. The rod 54 is then inverted and brazing material 58 is placed in the recess 56 and the combination brought up to brazing temperature to melt the material and enable it to bond fully to the core and the sheath. After the rod 54 and the material 58 have cooled, the firing end portion of the rod 54 is cut off at 60 and ground to provide a smooth lower surface and a protective tip 62. The pin 26 can then be mechanically joined to the rod 54 to complete the modified electrode. It will be noted that the electrode 20 of FIGS. 1–4 provides an additional connection for the protective tip 52 by means of the flange 42 whereas the protective tip 62 of FIG. 7 has no corresponding additional connection but relies solely on the bond between the brazing material and the core and sheath.

Nickel-base brazing materials which have been found to be particularly effective for the protective tips 44 and 62 include from about 80% to about 95% nickel plus phosphorous or boron or both, with a melting point from 1600° F. to 1900° F. Small amounts of silica, manganese, chromium, iron and aluminum may also be present. In general, 80–95% nickel, 5–15% phosphorous, and 0.5–4% boron plus small amounts of silica and manganese and, perhaps, one or more of the aforementioned materials are suitable. More specifically, a material which is particularly effective includes 85.5% nickel, 7.5% phosphorous, and the balance of boron, silicon, manganese, chromium, and iron. Nickel-base alloys with larger amounts of boron and lesser amounts of phosphorous have also been successfully used, although the above specific composition is preferred because it provides greater resistance to oxidation and corrosion not only in use but also during the brazing operation. When the material is brazed, a suitable flux of, for example, boric acid, borax, and alkaline metal fluoride is used with sufficient water to form a paste.

Various modifications of the above described embodiments of the invention will be apparent to those skilled in the art, and it is to be understood that such modifications can be made without departing from the scope of the invention, if within the spirit and tenor of the accompanying claims.

What we claim is:

1. A central electrode for a spark plug, said electrode comprising a rod having a core of material of high heat conductivity and a sheath of a material resistant to erosion and corrosion, a recess in an end of said rod, and a brazing material having a corrosion resistance approximately that of said sheath in said recess with the portion of the brazing material exposed at the end of said rod being flush with said end and with an upper part of said brazing material intimately bonded to said core.

2. A central electrode for a spark plug, said electrode comprising a rod having a core of copper and a sheath therearound of a nickel-containing steel, a recess in one end of said rod, and a nickel-based brazing material in said recess with the portion of the material exposed at the end being flush therewith and with an upper part of said brazing material intimately bonded to said core.

3. A central electrode for a spark plug, said electrode comprising a rod having a core of highly conducting material and a sheath of a nickel-containing steel resistant to erosion and corrosion, a recess in an end of said rod, and a brazing material in said recess with the portion of the material exposed at the end of said rod being flush with said end and with an upper part of said brazing material intimately bonded to said core, said brazing material consisting essentially of about 80–95% nickel, about 5–15% phosphorous, and the balance being essentially boron, silicon, and manganese.

4. A central electrode for a spark plug, said electrode comprising a rod having a core of copper and a sheath therearound of a nickel-containing steel, a recess in one end of said rod, and a brazing material in said recess with the portion of the material exposed at the end being flush therewith and with an upper part of said brazing material intimately bonded to said core, said brazing material containing from about 80% to about 95% nickel, from about 5% to about 15% phosphorous, and from about 0.5% to about 5% boron.

5. A method of manufacturing a spark plug electrode, said method comprising providing a rod including a core of a highly heat-conducting material and a sheath therearound of a metal having high resistance to corrosion and erosion, removing part of the core from one end of the rod to leave a recess therein, placing powdered brazing material in said recess, heating said rod and said powder to a temperature at which the powder will melt and at least partially fill said recess, and cooling the combination.

6. A method of manufacturing a spark plug electrode, said method comprising providing a rod including a core of a highly heat-conducting material and a sheath therearound of a metal having high resistance to corrosion and erosion, removing part of the core from one end of the rod to leave a recess therein, placing powdered brazing material in said recess, heating said rod and said powder to a temperature at which the powder will melt and at least partially fill said recess, cooling the combination, and cutting off said sheath and part of the cooled metal to form a flush end for said rod.

7. A method of manufacturing a spark plug electrode, said method comprising providing a rod including a core of a highly heat-conducting material and a sheath therearound of a metal having high resistance to corrosion and erosion, removing part of the core from one end of the rod to leave a recess therein, bending over said sheath to enclose partially said recess and leave a hole in said end for access to the recess, placing a powdered brazing material in said recess, heating said rod and said powder to a temperature at which the powder will melt and fill said recess, and cooling the combination.

References Cited in the file of this patent

UNITED STATES PATENTS

| | | |
|---|---|---|
| 2,266,318 | Heller | Dec. 16, 1941 |
| 2,318,922 | Carington | May 11, 1943 |
| 2,391,459 | Hensel | Dec. 25, 1945 |
| 2,783,409 | McDougal | Feb. 26, 1957 |
| 2,944,178 | Schaub | July 5, 1960 |

UNITED STATES PATENT OFFICE
CERTIFICATE OF CORRECTION

Patent No. 3,119,944                        January 28, 1964

Lawrence R. Lentz et al.

It is hereby certified that error appears in the above numbered patent requiring correction and that the said Letters Patent should read as corrected below.

In the drawing, reference numeral 14 should be added to Fig. 1 with a lead line pointing to the only component in this view which is cross-hatched for refractory material.

Signed and sealed this 19th day of April 1966.

(SEAL)
Attest:

ERNEST W. SWIDER
Attesting Officer

EDWARD J. BRENNER
Commissioner of Patents